United States Patent [19]

Sugimoto et al.

[11] Patent Number: 4,621,332

[45] Date of Patent: Nov. 4, 1986

[54] METHOD AND APPARATUS FOR CONTROLLING A ROBOT UTILIZING FORCE, POSITION, VELOCITY, SPRING CONSTANT, MASS COEFFICIENT, AND VISCOSITY COEFFICIENT

[75] Inventors: Koichi Sugimoto, Hiratsuka; Hisaaki Hirabayashi, Yokohama; Shinichi Arai, Yokohama; Shiyuki Sakaue, Yokohama, all of Japan

[73] Assignee: Hitachi, Ltd., Tokyo, Japan

[21] Appl. No.: 621,717

[22] Filed: Jun. 18, 1984

[30] Foreign Application Priority Data

Jun. 20, 1983 [JP] Japan .................................. 58-109171
Nov. 17, 1983 [JP] Japan .................................. 58-214998

[51] Int. Cl.$^4$ ............................................. G05B 13/00
[52] U.S. Cl. .................................... 364/513; 364/174; 318/568; 901/9
[58] Field of Search ............... 364/513, 474, 475, 174, 364/175; 318/568; 901/9

[56] References Cited

U.S. PATENT DOCUMENTS

| | | | |
|---|---|---|---|
| 4,098,001 | 7/1978 | Watson | 33/169 C |
| 4,156,835 | 5/1979 | Whitney et al. | 364/513 |
| 4,218,172 | 8/1980 | Feund | 364/513 |
| 4,243,923 | 1/1981 | Whitney et al. | 364/513 |
| 4,278,920 | 7/1981 | Ruoff | 318/568 |
| 4,362,978 | 12/1982 | Pollard et al. | 318/568 |
| 4,408,286 | 10/1983 | Kikuchi et al. | 364/513 |
| 4,453,221 | 6/1984 | Davis et al. | 364/513 |
| 4,521,844 | 6/1985 | Sturges et al. | 364/513 |

Primary Examiner—Jerry Smith
Assistant Examiner—Allen MacDonald
Attorney, Agent, or Firm—Beall Law Offices

[57] ABSTRACT

Method and apparatus for controlling a robot wherein a force signal is calculated by detecting a force applied to a hand of the robot, a first value representing a difference between the force signal and a force reference is calculated, a second value representing a product of a difference between a position signal representing current position and attitude of the hand and a position reference, multiplied by a spring constant is calculated, a third value representing a product of a velocity signal representing a current velocity of the hand, multiplied by a viscosity coefficient is calculated, and a command velocity of the hand is calculated based on the first, second and third values and a mass coefficient.

31 Claims, 22 Drawing Figures

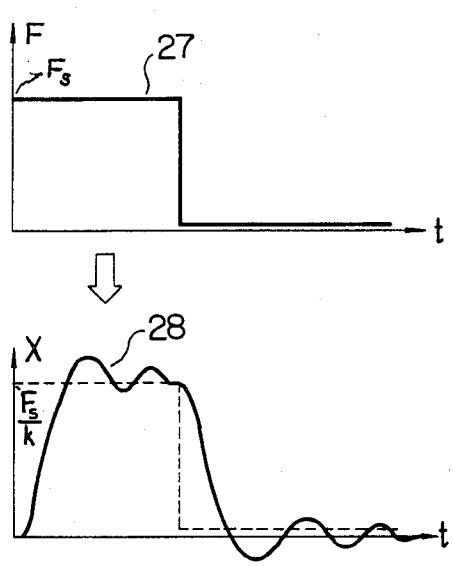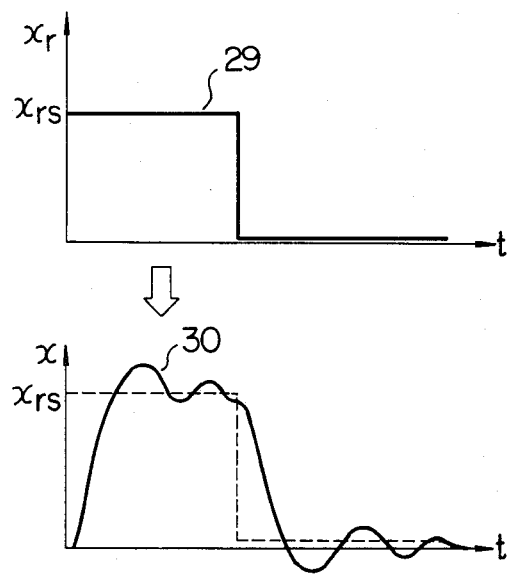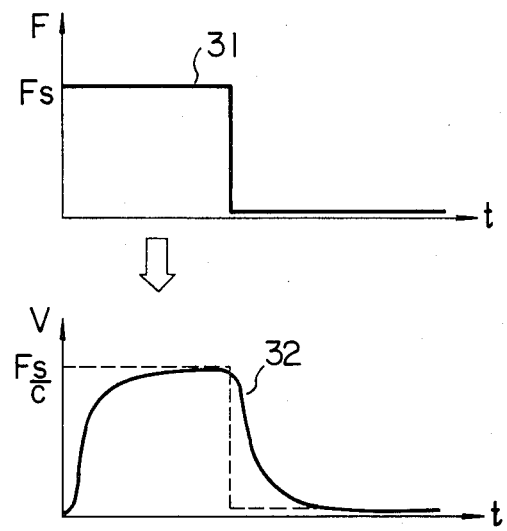

METHOD AND APPARATUS FOR CONTROLLING A ROBOT UTILIZING FORCE, POSITION, VELOCITY, SPRING CONSTANT, MASS COEFFICIENT, AND VISCOSITY COEFFICIENT

The present invention relates to method and apparatus for controlling a robot, and more particularly to method and apparatus for controlling a robot capable of performing various work with a high degree of freedom.

In recent years, the robots have been introduced in various fields because of their generality and applicability to versatile works as opposed to a special purpose machine.

When the robot is to be applied to a certain work, it is rare to use it alone but it is common to use it with a tool suitable to an object to be handled attached to the robot. For example, when the robot is used for field work or an assembly line, a tool suitable to a shape and a size of an object or a content of the work is mounted on a hand at an end of the robot or between an arm and the hand so that the robot conducts an assembly work or a painting work. In this case, a certain degree of flexibility is imparted to the tool so that a precision variation of the objects or a working error factor such as a positioning error is absorbed and eliminated. However, as the work content becomes more and more complex and sophisticated, a higher degree of flexibility and a higher performance of the tool are required and hence the tool tends to be more complex in structure and more expensive. It is not seldom that only one tool is not sufficient to meet the work requirement and exchange of the tools is required during the work depending on the shape of the object and the work condition. As a result, times for the exchange of the tools and the adjustments thereof are necessary. This not only reduces a work efficiency of the robot but also creates many problems such as maintenance and control of the tools to maintain the reliability of the work.

An example of the tool having a degree of flexibility is a remote center compliance (RCC) mechanism disclosed in the U.S. Pat. No. 4,098,001. When a force or a moment is applied to an end of a grasped object, the RCC mechanism parallelly moves or rotates so that a shaft part, for example, is fitted to a hole by merely linearly moving a robot hand. However, this RCC mechanism is not flexible enough to cope with a variation of a length of the shaft part or a fitting condition.

As described above, unlike a single purpose machine which can work with one type of part and one type of work, the robot finds its significance in the ability of handling a number of different parts and performing different work. Thus, if the robot requires the exchange of the tools whenever the type of part or the type of work changes, the characteristic of the robot is lost in the sense of generality or flexibility. However, it is a present status that such an exchange of tools or similar work is required with the present robot technology. In order to resolve the above problem, the tool may be provided with generality, but the tool having the generality is frequently complex in structure and includes unnecessary parts. As a result, more time is wasted than would be required to exchange the tools. Accordingly, if one tries to resolve the above problem with the mechanism, the flexibility is harder to resolve.

It is an object of the present invention to provide methods and apparatus for controlling a robot which can cope with various work conditions by merely changing control characteristic parameters without changing a tool.

In accordance with the present invention, a next velocity command to a hand of the robot is calculated based on a force signal relating to a force applied to the hand, a position signal relating to a position and an attitude of the hand and a velocity signal relating to a velocity of the hand, by using a force reference, a position reference, a mass coefficient, a spring coefficient and a viscosity coefficient as parameters. By changing those parameters, various operational characteristics may be imparted to the hand. By setting the parameters for a tool having an operational characteristic desired to the robot, the operational characteristic of the hand which will be attained when the tool is incorporated in the robot is obtained.

The present invention will be apparent from the following detailed description taken in conjunction with the accompanying drawings, in which:

FIG. 4 illustrates a first operation of the robot in accordance with the present control method;

FIG. 5 illustrates a second operation of the robot in accordance with the present control method;

FIG. 6 illustrates a third operation of the robot in accordance with the present control method;

The present invention is now described in detail with reference to the drawings.

Figure 1:
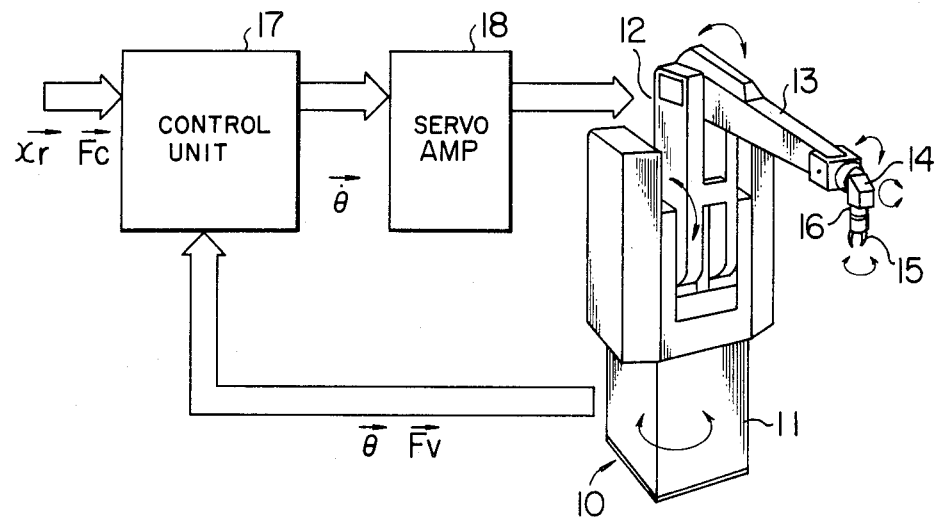
FIG. 1 shows an overall configuration for a robot control method of the present invention.

FIG. 1 shows an overall configuration of an articular robot and a control unit. The articular robot 10 which is an example of a robot to be controlled has a swivel 11 which can be swivelled around a vertical axis on a base, an upper arm 12 pivotable around a horizontal axis on the swivel 11, a front arm 13 pivotable around another horizontal axis at an end of the upper arm 12 and a wrist 14 having three degrees of freedom at an end of the front arm 13. Thus, the articular robot 10 has six degrees of freedom. The wrist 14 has a hand 15 for gripping an object to be handled and a force sensor 16 for sensing a force applied to the robot. Coupled to each of motors M for driving the swivel 11, the upper arm 12, the front arm 13 and the wrist 14, respectively, are an encoder PE for detecting a rotational angle and a tachogenerator TG for detecting a rotating speed.

Figure 2:
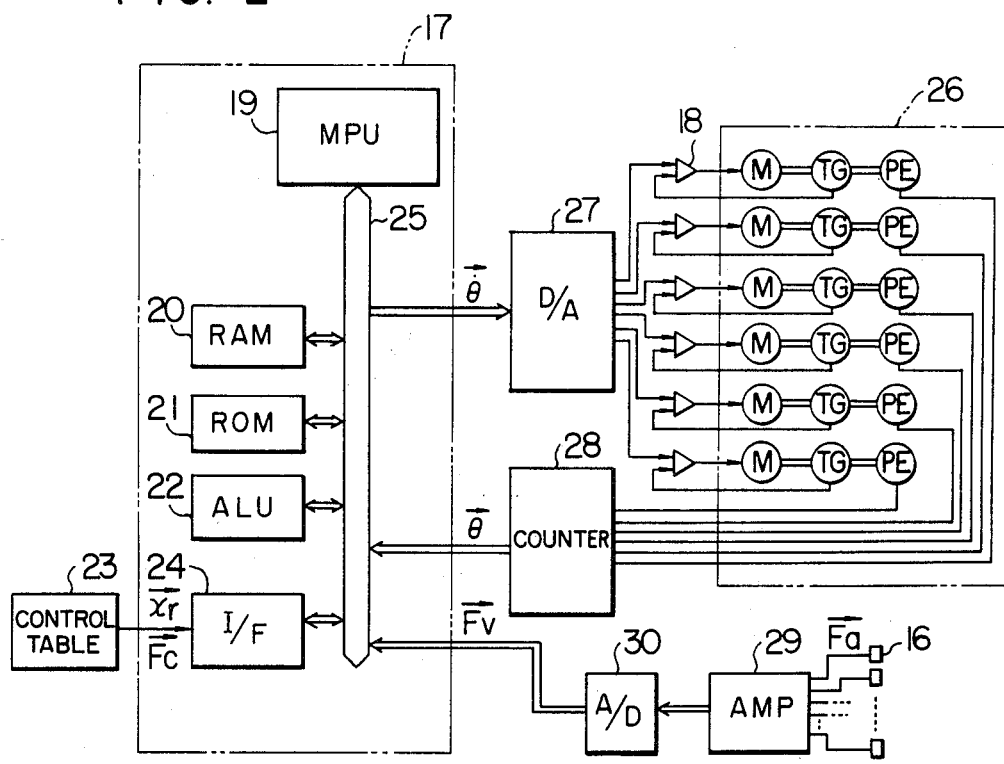
FIG. 2 shows a configuration of a robot control apparatus of the present invention.

A control unit 17 reads in a robot position signal $\vec{\theta}$ and a force signal $\vec{Fv}$ of a force applied to the robot, from the encoder PE and the force sensor 16, respectively, calculates a robot articulation angular velocity $\vec{\theta}$ based on a preset position reference $\vec{Xr}$ and a force reference $F_c$ and supplies it to operate the articular robot 10. FIG. 2 shows a configuration of the control unit and a robot drive unit. The control unit 17 comprises a microprocessor 19 for carrying out controls and arithmetic operations, a RAM 20, a ROM 21, an ALU for carrying out a predetermined functional operation, an interface circuit (I/F) 24 connected to a control table and a bus line 25 connected to those units. Connected to the bus line 25 are a D/A converter 27 for converting an angular velocity digital signal to an analog signal for supplying it to the motor M in the robot drive unit 26 through a servo amplifier 18, a counter 28 for counting an output of the encoder PE connected to the motor M and an A/D converter 30 for converting an analog signal representing a force supplied from the force sensor 16 through an amplifier 29.

The position reference $\vec{Xr}$ and the force reference $\vec{Fc}$ may be zero. In this case, the articular robot 10 is operated only in accordance with the force $\vec{Fv}$ applied to the hand 15. That is, it is a passive mechanism. On the other hand, if only the position reference $\vec{Xr}$ and the force reference $\vec{Fc}$ are given, the articulate robot 10 is operated only in accordance with those references.

Figure 3:
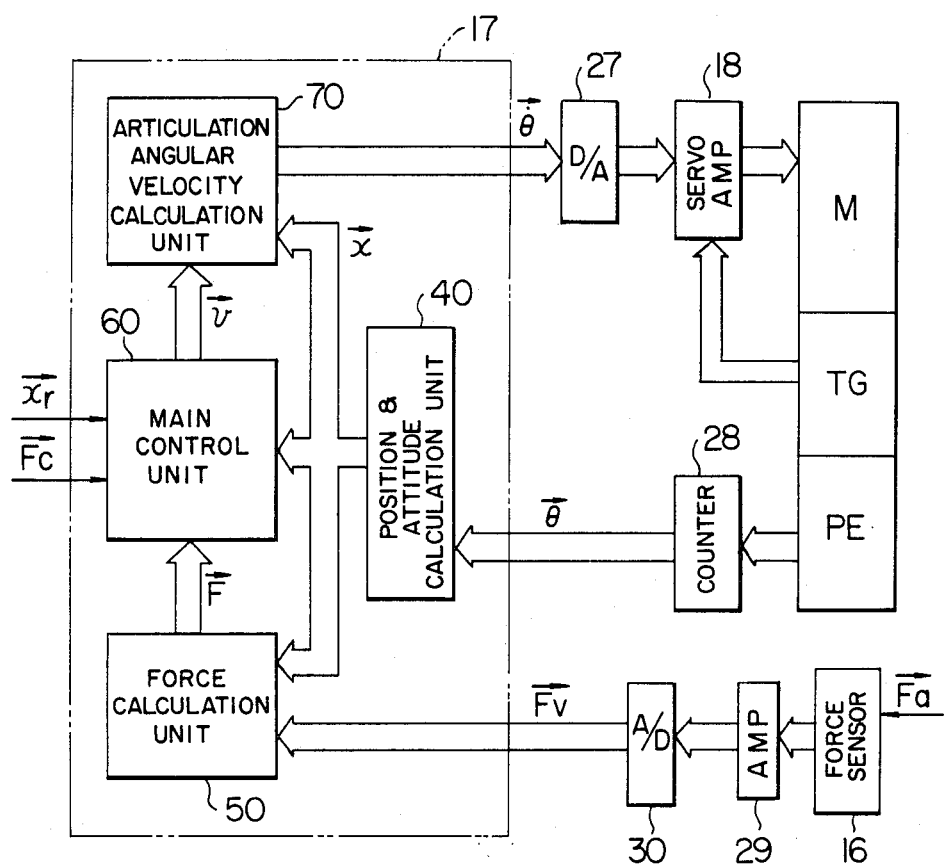
FIG. 3 is a schematic block diagram of the robot control apparatus of the present invention.

The control unit performs the following functions. FIG. 3 is a schematic block diagram showing the operation of the control unit 17.

A position and attitude calculation unit 40 of the control unit 17 receives the robot position signal $\theta$ from the counter 28 which counts the signal from the encoder PE for each articulation of the robot and converts the angle of the articulation to an orthogonal coordinate x of the hand system to calculate the position and the attitude of the hand. Actually, it is carried out by the ALU 22 under the command from the microprocessor 19 of FIG. 2. The force sensor 16 detects an external force $\vec{Fa}$ applied to the robot and the control unit 17 reads in a voltage $\vec{Fv}$ of a strain gauge of the force sensor 16 through the amplifier 29 and the A/D converter 30. A force calculation unit 50 reads in $\vec{Fv}$ and $\vec{x}$ and converts the strain gauge voltage $\vec{Fv}$ to a force by a strain-force conversion matrix. Actually, it is also carried out by the ALU 22 under the command from the microprocessor 19 of FIG. 2. When weights of the hand 15 and the article gripped by the hand 15 are heavy, the force applied to the force sensor 16 differs depending on the attitude of the hand. Accordingly, the attitude of the hand is calculated based on $\vec{x}$, an affect thereby is eliminated and the force $\vec{Fa}$ actually applied to the robot is estimated. The estimated force $\vec{F}$ is applied to a control main unit 60 which calculates a velocity of the hand 15 based on the calculated force $\vec{F}$, the robot position $\vec{x}$, the preset force $\vec{Fc}$ and the position reference $\vec{Xr}$. Since this velocity is represented by the coordinate fixed to the hand, it is converted to a velocity $\vec{v}$ represented by the base coordinate.

Then, an angular velocity $\vec{\theta}$ for the robot shaft is calculated by an articulation angular velocity calculation unit 70 based on the velocity $\vec{v}$ in the orthogonal coordinate, where $\vec{\theta} = J^{-1}\vec{v}$ and $J^{-1}$ is an inverse Jacobian matrix whose elements are functions of the robot position signals $\vec{\theta}$.

The angular velocity $\vec{\theta}$ is converted to an analog signal by the D/A converter 27 and it is supplied to the articulation motor M of the robot through the servo amplifier 18 to operate the robot.

The operation of the control unit 17 has thus far been described. The operation of the control main unit 60 is a characteristic portion of the present invention. A principle thereof is described below.

In general, the movement of the flexible tool is related to an inertia force, a restoring force of a spring, a viscosity force by a damper and an applied force. In order to simplify the explanation, a tool having one degree of freedom is considered. A mathematical model of the tool having one degree of freedom is shown below.

$$m\frac{dv}{dt} + Cv + k(x - x_r) = F - Fc \qquad (1)$$

where m is a mass of the hand, k is a spring coefficient of the spring, C is a viscosity coefficient of the damper, $x_r$ is the position reference and Fc is the force reference. The formula (1) shows that the position and the velocity of the tool are x and v, respectively, when the force (F−Fc) is applied to the tool. In other words, it shows that when the force (F−Fc) is applied to the hand of the robot, the robot hand has the position x and the velocity v so that the robot hand is moved as if the tool were mounted thereon even if it is not actually mounted.

Thus, by controlling the robot by assuming a tool which is desired to be mounted on the robot, the robot hand can follow the movement which would be attained when the tool is mounted on the robot.

When the motor M for driving the articulation is actually driven, it is useful to calculate the velocity v by the calculation means to supply the velocity or the velocity command to the servo amplifier. Accordingly, the formula (1) is modified as follows:

$$v = \frac{1}{m}\int[(F - Fc) - k(x - x_r) - Cv]dt \qquad (2)$$

The formula (2) is represented in a discrete value system as follows.

$$v_n = \frac{\Delta t}{m}\sum_{i=0}^{n-1}[(F_i - Fc_i) - k(x_i - x_{ri}) - Cv_i] \qquad (3)$$

$$= \frac{\Delta t}{m}[(F_{n-1} - F_{c,n-1}) - k(x_{n-1} - x_{r,n-1})] + \qquad (4)$$

$$\left[1 - \frac{\Delta t}{m}C\right]V_{n-1}$$

where $\Delta t$ is a sampling time and suffixes i and n indicate i-th and n-th values, respectively.

As is apparent from the above formula, the processing method of the present invention does not includes a differentiation process in the calculation of the velocity and hence it is strong (i.e., relatively immune) to a noise, eliminates a malfunction and provides a stable movement to the robot hand. The formula (4) in the discrete value system includes $v_{n-1}$ (which is v immediately preceding to n) in the right side and $v_n$ in the left side. In order to calculate the velocity v of the n-th robot hand by the calculation means, only the immediately preceding velocity $V_{n-1}$ is needed, and it is not necessary to detect the actual velocity v by the tachogenerator and feed it back for each time. This is advantageous because the detection of the velocity of the robot hand by the velocity sensor such as the tachogenerator TG mounted to the robot drive unit is less reliable than the detection of the position of the robot hand by the position sensor such as the encoder PE mounted on the robot drive unit.

In the above formula (4), only $x_{n-1}$ relates to the position x. Accordingly, the position x need be detected each time but it can be calculated from the position signal $\vec{\theta}$ of the robot (articulation angle) from the encoder PE.

In the above formula, m, k and c are determined by assuming a characteristic of the tool. Once these characteristics of the tool are assumed, the mechanism of the tool is analized and those values are determined in offline before the robot is operated and the values are obtained from the control table 23 as data inherent to the tool (either constants or variables) and stored in the RAM 20 of the control unit 17. If a plurality of tools are assumed, the corresponding number of data are stored. A stable condition for the system shown by the formula (1) is well known by a basic theory of a normal differentiation equation. By determining m, c and k in accordance with the stable condition, the system may be stabilized or dispersed. Similarly, in order to stabilize the system of the formula (4) which is the representation of the formula (2) in the discrete value system, it is necessary that $\Delta t$ is sufficiently small in addition to the above condition.

$$\left| \frac{\Delta t}{m} \right| < 1 \tag{5}$$

where $\Delta t$ is a sampling time which is a positive value, and m is a mass which is a positive value. For the stabilization, c is a positive value.

So far, the method for causing the robot to assume the operational characteristic of the tool in accordance with the present invention has been described. It relates to the method based on the values of m, c and k.

In the present invention, it is also possible to determine the operational characteristic of the tool based on other variables, that is, the force F applied to the robot, the force reference Fc and the tool position reference $x_r$. When those three values F, Fc and $x_r$ are used as the command values, a number of combinations are possible and various operational characteristics may be imparted to the tool. The following operation are described as specific examples.

FIG. 4 shows a first operation example. The conditions therefor are $4mk-C^2>0$, $C>0$, $m>0$, $x_r=0$ and Fc=0. When the F is a stepwise input Fs 27 as shown in FIG. 4, the position x is represented by the time t as follows.

$$x = \frac{Fs}{k}\left\{1 - e^{pt}\left(\cos qt - \frac{p}{q}\sin qt\right)\right\} \tag{6}$$

where $x_{t=0}=0$, $v_{t=0}=0$, $p=(-C/2m)$ and $q=4mk-C^2$.

The robot output 28 is shown in FIG. 4. The position converges to a value proportional to the magnitude of the step input Fs 27 and a rise time and an oscillation are determined by m, c and k.

FIG. 5 shows a second operation example. The conditions therefor are $4mk-C^2>0$, $c>0$, $m>0$, $F=0$ and Fc=0. When a step input $x_{rs}$ 29 is applied as $x_r$ as shown in FIG. 5, the position x is represented by the time t as follows:

$$x = x_{rs}\left\{1 - e^{pt}\left(\cos qt - \frac{p}{q}\sin qt\right)\right\} \tag{7}$$

where $x_{t=0}=0$ and $v_{t=0}=0$.

The robot output 30 is shown in FIG. 5.

As seen from the output 28 shown in FIG. 4 and the output 30 shown in FIG. 5, and as can be predicted from those outputs and the formula (1), the same output is obtained under a certain condition whether the step input is applied as F or $x_r$.

Namely, the variable may be F or $x_r$ to obtain the same output and hence versatile controls can be attained as required.

FIG. 6 shows a third operation example. The conditions therefor are $k=0$, $m>0$, $c>0$, $x_r=0$ and Fc=0. When a step inputs Fs 31 is applied as F as shown in FIG. 6, the velocity v is represented by the time t as follows.

$$v = \frac{Fs}{c}\left(1 - e^{-\frac{c}{m}t}\right) \tag{8}$$

In this case, the robot hand velocity is shown by 32 in FIG. 6 and it converges unlike the first and second operation examples. Thus, the robot hand velocity can be controlled by the force.

While three simple operation examples have been shown, the present invention can perform many other useful controls.

So far, the principle and the operation examples for the control of the robot having one degree of freedom have been described.

Actually, however, it is rare to use the tool having one degree of freedom and a tool having a high degree of freedom is frequently used. For the multiple degree of freedom, the formula (1) is generalized by vectors into the following formula.

$$[M]\frac{d\vec{v}}{dt} + [C]\vec{v} + [K](\vec{x} - \vec{x}_r) = \vec{f} - \vec{f}_r \tag{9}$$

where
$\vec{x}$ is a position vector (a translational position and a rotation angle of the robot in the orthogonal coordinate),
$\vec{v}$ is a velocity vector (a translational velocity and a rotation angle of the robot in the orthogonal coordinate),
$\vec{f}$ is a vector of the force signal (including a translational force and a rotational force) detected by the force sensor,
$\vec{f_c}$ is a vector of the force reference,
$\vec{x_r}$ is a vector of the position reference,
[M] is a matrix representing a virtual mass of the tool,
[C] is a matrix representing a virtual viscosity coefficient of the tool, and

[K] is a matrix representing the spring constant of the tool.

The [M], [K] and [C] are usually diagonal matrices.

The formula (9) is modified as follows.

$$\vec{v} = [M]^{-1} \int [(\vec{f} - \vec{f}) - ([C]\vec{v} + [K](\vec{x} - \vec{rx}))]dt \quad (10)$$

The calculation of the formula (10) is, actually, carried out by the computer in the discrete value system as follows:

$$\vec{v_n} = \Delta t[M]^{-1} \sum_0^{n-1} [(\vec{f_i} - \vec{f_i}) - ([K](\vec{x_i} - \vec{rx_i}) + [C]\vec{v_i})] \quad (11)$$

$$= \Delta t[M]^{-1}[(\vec{f_{n-1}} - \vec{f_{n-1}}) - [K](\vec{x_{n-1}} - \vec{rx_{n-1}})] + \quad (12)$$

$$[[I] - \Delta t[M]^{-1}[C]]\vec{v_{n-1}}$$

where
$n = 1, 2, \ldots$,
$\Delta t$ is a scalar representing the sampling time, and
[I] is a unit matrix.

In the formula (12), it is necessary to separately determine the initial value $\vec{v_0}$, and for the multiple degree of freedom, it is necessary to assume a tool having an equal or lower degree of freedom than that of the robot.

The multiple degree of freedom has thus been described. As explained in connection with the one degree of freedom, the position information and the velocity information necessary to calculate the velocity can be obtained by the hardware detectors or the software calculation, and various combinations may be considered.

Figure 7:
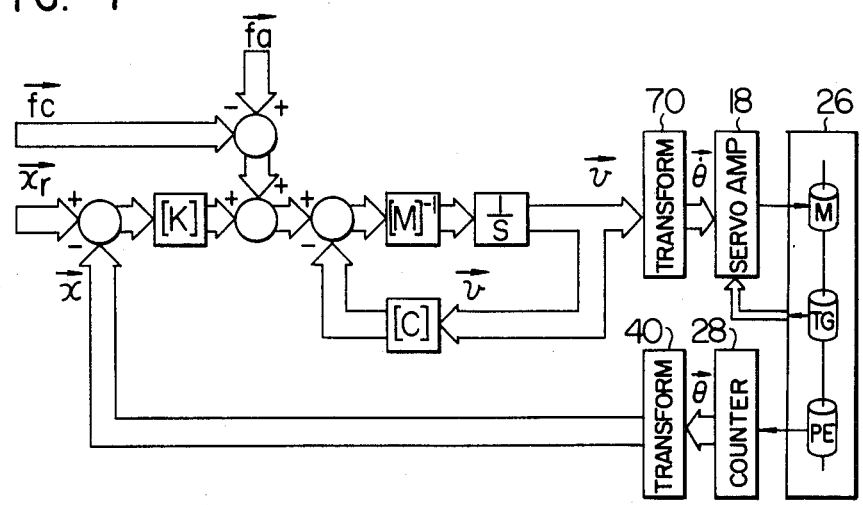
FIG. 7 is a block diagram of a first embodiment of an operation flow in the present control method.

FIG. 7 shows a block diagram of a first method in which the position feedback uses the position information from the encoder PE and the velocity feedback uses the calculation result $\vec{v}$.

In the right side of the formula (10), $\vec{x}$ is the value detected by the encoder and $\vec{v}$ is not the value detected by the tachogenerator TG but the value calculated by the calculation means.

The transform from $\vec{v}$ to $\vec{\theta}$ is done by using the matrix $[J]^{-1}$ (where [J] is a Jacobian matrix), and the transform from $\theta$ to x is done by the coordinate transform from the articulation coordinate system to the orthogonal coordinate system.

Figure 8:
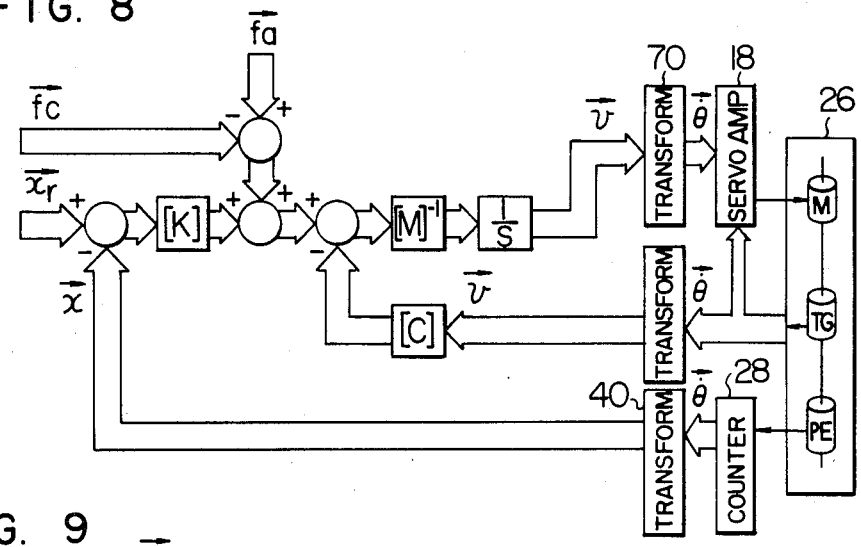
FIG. 8 is a block diagram of a second embodiment of the operation flow in the present control method.

FIG. 8 is a block diagram of a second method in which both the position feedback and the velocity feedback use the information from the detectors.

The value $\vec{x_n}$ in the discrete value system is determined by the following formula.

$$\vec{x_n} = \Delta t \vec{v_{n-1}} + \vec{x_{n-1}} \quad (13)$$

where $n = 1, 2, \ldots$.

Figure 9:
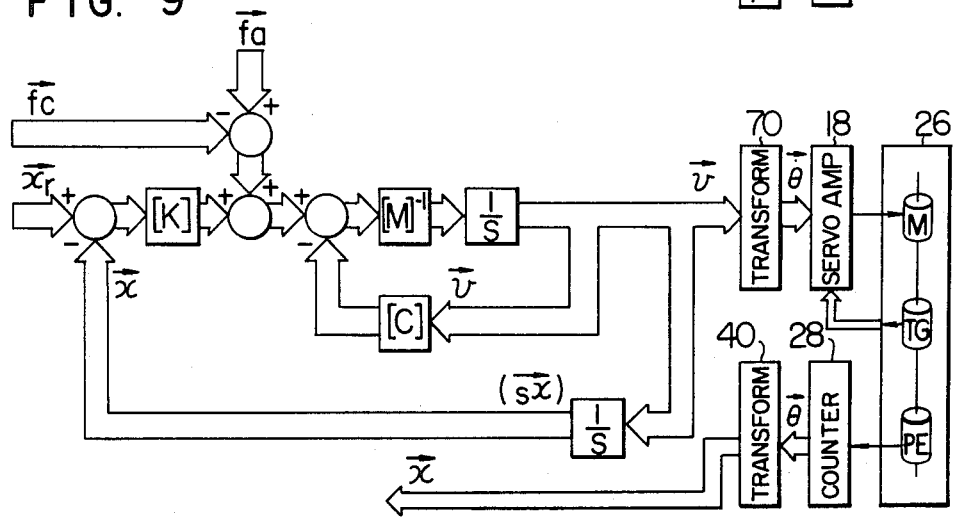
FIG. 9 is a block diagram of a third embodiment of the operation flow in the present control method.

FIG. 9 is a block diagram of a third method in which both the position feedback and the velocity feedback use the calculation results. In this method, the position $\vec{x}$ and the velocity $\vec{v}$ are fed back based on the calculation results. In this case, the initial values $\vec{v_0}$ and $\vec{x_0}$ in the formula (12) must be separately determined.

The above three methods have the following features. For the purpose of the feedback, it is desirable to detect the actual position and the actual velocity and feed them back as is done in the second method (FIG. 8). However, judging from the present technical level, the detector PE mounted on the robot has a fairly high precision but the velocity detector TG has a lower precision. Accordingly, the first method (FIG. 7) which is a compromise of both is practically best.

The third method (FIG. 9) needs no detector although it needs many calculation steps.

Since the tool has up to six degrees of flexibility, the matrix is a 6×6 matrix. However, since the degree of freedom and the size of the tool may change depending on the work, the values of the matrices [K], [C] and $[M]^{-1}$ may be experimentally determined in accordance with the tool and stored in the ROM 21 of the control unit 17 in accordance with the tool and the work content. Since the size of the tool relates to the vector quantities, it should be stored in the table of the ROM 21 in accordance with the tool and the work content.

As described above, according to the present invention, various flexibilities can be imparted to the tool by the control of the robot.

Figure 10:
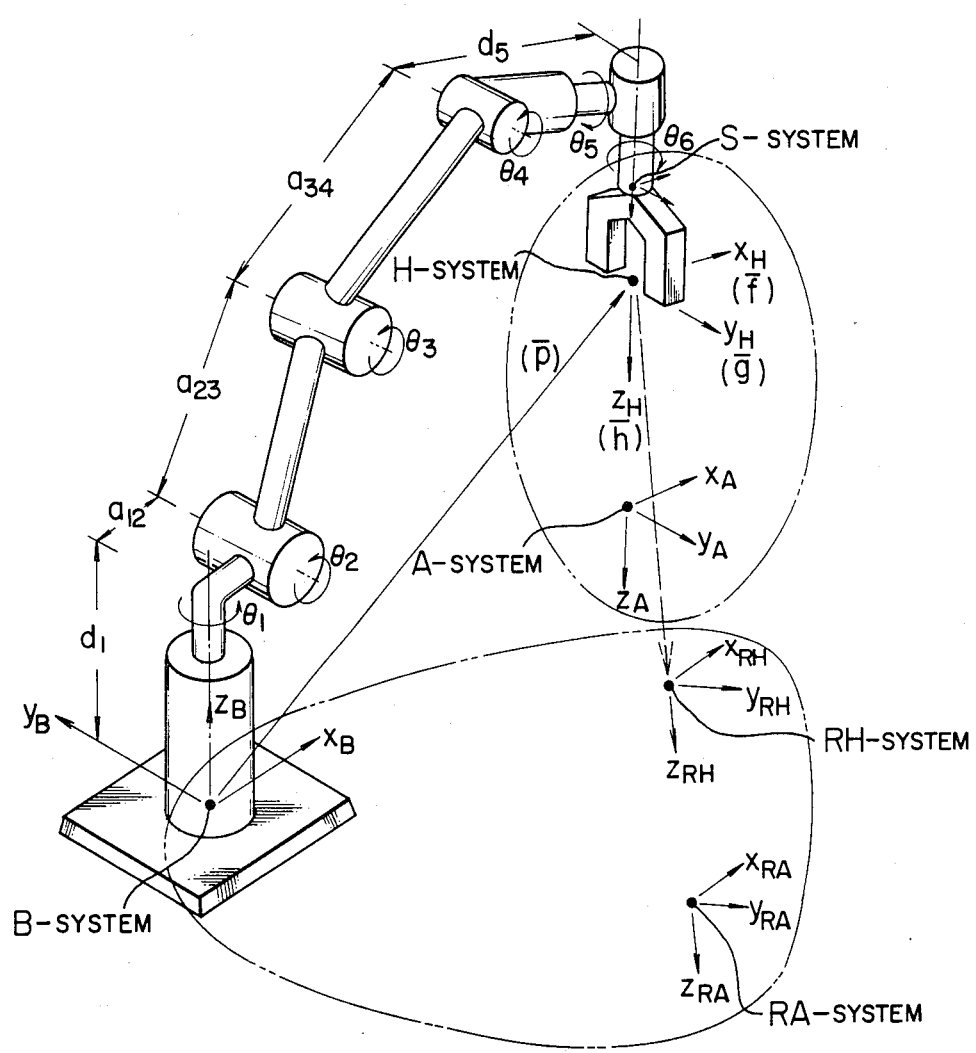
FIG. 10 shows a construction of the robot and a coordinate system.

A calculation process of the angular velocity in the present invention is next explained. First, a structure of a model robot, coordinates and symbols are explained. As shown in FIG. 10, six elements are usually required for the robot to spatially position a rigid body. Accordingly, an articulate robot having six degrees of flexibility is used because it has a wide movable range relative to an installation space. The articulate robot is represented by rotation angles $\theta_i$ ($i = 1-6$) of the articulations and arm lengths $d_1$, $a_{12}$, $a_{23}$, $a_{34}$, $d_5$ (I). The following coordinate systems are set. A base coordinate system (B-system) is fixed to the installation position of the robot, a hand coordinate system (H-system) is fixed to the hand at an end of the robot, a sensor coordinate system (S-system) is fixed to the sensor, an auxiliary coordinate system (A-system) having an origin at a reference point of a rotational moment of the movement is set to set the operational condition and calculate the command velocity, a reference coordinate (RH-system) which corresponds to the H-system and is determined by equilibrium position and attitude of a spring is set, and a reference coordinate system (RA-system) which corresponds to the A-system and is determined by the equilibrium position and attitude of the spring is set.

The following four three-dimensional vectors are defined to represent the position and the attitude of the hand:

$\bar{p}$: an origin of the H-system represented in the B-system $\bar{f}$: a unit vector in an x-direction of the H-system represented in the B-system $\bar{g}$: a unit vector in a y-direction of the H-system represented in the B-system $\bar{h}$: a unit vector in a z-direction of the H-system represented in the B-system.

Figure 11:
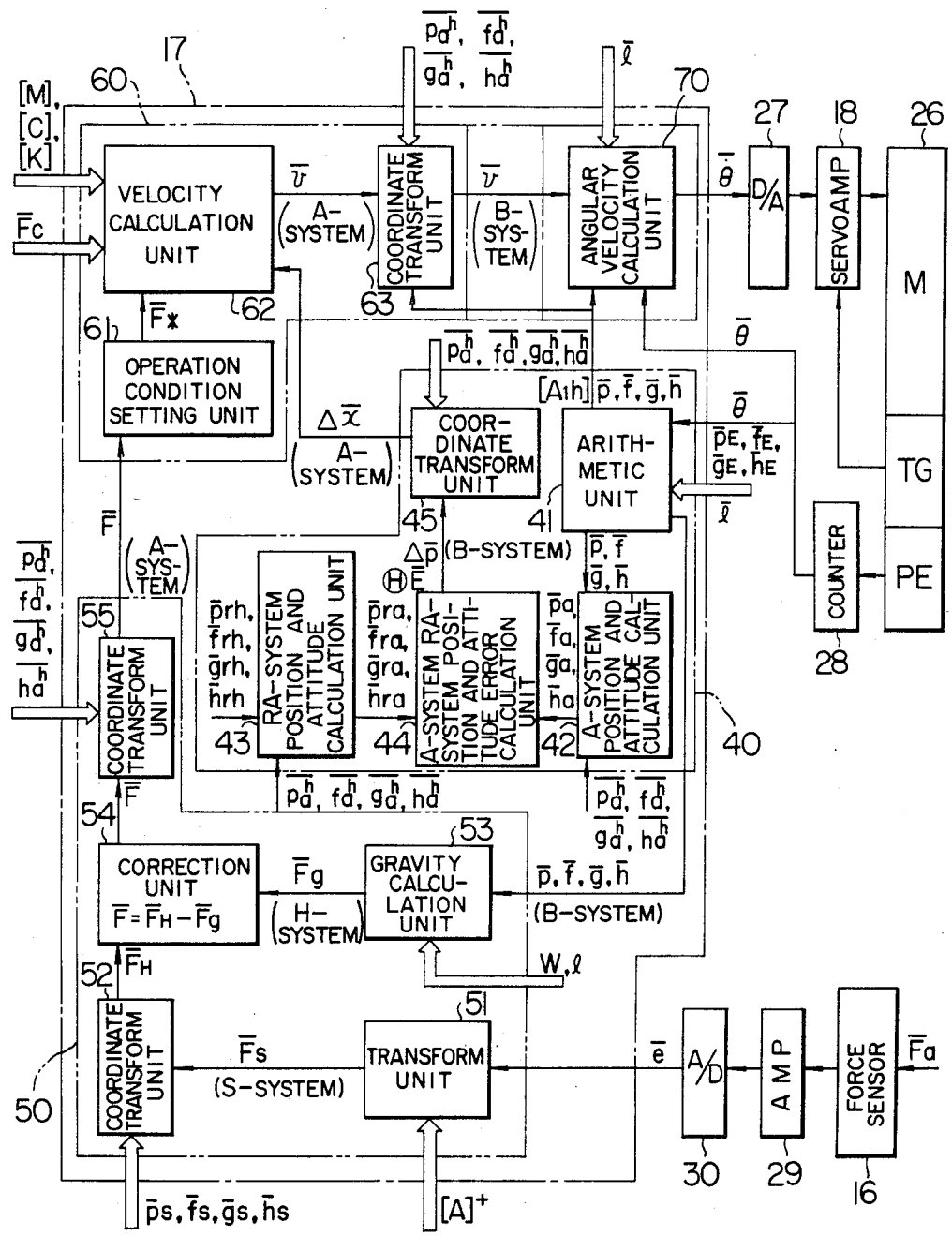
FIG. 11 is a detailed block diagram of the present robot control apparatus.

One embodiment of the calculation method for the angular velocity $\vec{\theta}$ in accordance with the present invention is described below with reference to the structure of the robot, the coordinate systems and the symbols defined above. FIG. 11 shows a further detail of the block diagram of FIG. 3. As described above, the control unit 17 comprises four major blocks, the position and attitude calculation unit 40, the force calculation unit 50, the control main unit 60 and the articulation angular velocity calculation unit 70.

The force calculation unit 50 comprises a transform unit 51, a coordinate transform unit 52, a gravity calculation unit 53 and a correction unit 54. When an external force $\bar{F_a}$ is applied to the robot hand, a sensing device such as a strain gauge of the force sensor 16 mounted on the robot senses it and a voltage $\bar{e}$ representing the applied force and moment is produced by the A/D converter 30 through the amplifier 29 and it is supplied to the transform unit 51. The voltage $\bar{e}$ supplied to the transform unit 51 is multiplied with a voltage-force transform matrix $[A]^+$ to calculate a force $\overline{Fs}$ in the S-system. The transform matrix $[A]^+$ is obtained by applying a reference load to the force sensor 16 in an axial direction to calibrate it, obtaining a matrix $[A]$ defined by $\bar{e} = [A]\overline{Fs}$, and calculating $[A]^+$ in accordance with $[A]^+ = ([A]^T[A])^{-1}[A]^T$. The transform matrix $[A]^+$ is previously calculated and stored, and it is treated as a constant during the control process. One force sensor corresponds to one transform matrix $[A]^+$. When another force sensor is used, a corresponding transform matrix $[A]^+$ is determined. Since the calculated force $\overline{Fs}$ is represented in the S-system, it is supplied to the coordinate transform unit 52 to transform it to the H-system. The coordinate transform unit 52 transforms the force $\overline{Fs}$ in the S-system to the force $\overline{F_H}$ in the H-system by using the origin and the attitude (unit vectors in the respective axes) of the S-system in the H-system $\overline{P}_s(\bar{f}_s, \bar{g}_s, \bar{h}_s)$ as parameters. The transformed force $\overline{F_H}$ is supplied to the correction unit 54. On the other hand, the gravity calculation unit 53 calculates a force which influences the force sensor 16 by the weight of the hand and an object, that is, a gravity component $\overline{Fg}$ of the hand and the object based on the position and the attitude $\overline{P}(\bar{f}, \bar{g}, \bar{h})$ of the hand in the B-system calculated by the position and attitude calculation unit 40, by using the weight W of the hand and the object and a center of gravity position $\bar{d}$ as parameters. The correction unit 54 eliminates the affect by the gravity of the hand and the object from $\overline{Fg}$ and $\overline{F_H}$ to determine the force $\overline{F}$ actually applied to the hand in accordance with $\overline{F} = \overline{F_H} - \overline{Fg}$. Since the corrected force $\overline{F}$ is represented in the H-system, it should be transformed to the A-system for the velocity calculation. Accordingly, the corrected force $\overline{F}$ is transformed to the A-system by the coordinate transform unit 55 by using the origin position of the A-system and the attitude (unit vectors in the respective axes) $\overline{Pa^n}(\bar{fa^n}, \bar{ga^n}, \bar{ha^n})$ as parameters, and it is supplied to the control main unit 60. When it is not necessary to calculate the velocity in the A-system but to calculate it in the H-system depending on the control mode of the hand, the coordination transform in the coordinate transform unit 55 is not necessary.

The position and attitude calculation unit 40 comprises an arithmetic unit 41, an A-system position and attitude calculation unit 42, an RA-system position and attitude calculation unit 43, an A-system and RA-system position and attitude error calculation unit 44 and a coordinate transform unit 45. The arithmetic unit 41 calculates position and attitude $\overline{P}(\bar{f}, \bar{g}, \bar{h})$ of the hand in the B-system based on the position signal $\theta$ obtained from the counter 28 based on the position information of the encoder PE directly coupled to the motor M, by using the length $\bar{l}$ of the robot arm and the position and attitude $\overline{P_E}(\bar{f_E}, \bar{g_E}, \bar{h_E})$ of the hand relative to the end of the arm as parameters. The vectors $\overline{P}, \bar{f}, \bar{g}$ and $\bar{h}$ can be obtained from the following formulas.

$$\left.\begin{array}{l}\left(\dfrac{\overline{P}}{1}\right) = [A_{1h}] \begin{pmatrix} 0 \\ 0 \\ 0 \\ 1 \end{pmatrix} \\[2ex] \left(\dfrac{\bar{f}}{1}\right) = [A_{1h}] \begin{pmatrix} 1 \\ 0 \\ 0 \\ 0 \end{pmatrix} \\[2ex] \left(\dfrac{\bar{g}}{1}\right) = [A_{1h}] \begin{pmatrix} 0 \\ 1 \\ 0 \\ 0 \end{pmatrix} \\[2ex] \left(\dfrac{\bar{h}}{1}\right) = [A_{1h}] \begin{pmatrix} 0 \\ 0 \\ 1 \\ 0 \end{pmatrix}\end{array}\right\} \quad (14)$$

where $[A_{1h}]$ indicates a transform matrix from a first coordinate system to the H-system and it is a function of $\bar{\theta}, \bar{l}, \overline{P_E}, \bar{f_E}, \bar{g_E}$ and $\bar{h_E}$. The calculated position and attitude $\overline{P}, (\bar{f}, \bar{g}, \bar{h})$ of the hand are supplied to the gravity calculation unit 52 of the force calculation unit 50, an angular velocity calculation unit 70 to be described later, and the A-system position and attitude calculation unit 42.

The RA-system position and attitude calculation unit 43 calculates equilibrium position and attitude $\overline{P_{ra}}, (\bar{f_{ra}}, \bar{g_{ra}}, \bar{h_{ra}})$ of a translation spring and a rotation spring for the A-system based on equilibrium position and attitude $\overline{P_{rh}}, (\bar{f_{rh}}, \bar{g_{rh}}, \bar{h_{rh}})$ of the translation spring and the rotation spring for the H-system (hand) by using $\overline{P_a{}^h}, (\bar{f_a{}^h}, \bar{g_a{}^h}, \bar{h_a{}^h})$.

The A-system/RA-system position and attitude error calculation unit 44 calculates a position error $-\Delta p$ and an attitude error $\overline{E}$, $\textcircled{H}$ based on $\overline{P_{ra}}, (\bar{f_{ra}}, \bar{g_{ra}}, \bar{h_{ra}})$ and $\overline{P_a}, (\bar{f_a}, \bar{g_a}, \bar{h_a})$.

$$\Delta P = \overline{P_a} - \overline{P_{ra}} \tag{15}$$

$$\overline{E} = \dfrac{(\bar{f_a} - \bar{f_{ra}}) \times (\bar{g_a} - \bar{g_{ra}})}{|(\bar{f_a} - \bar{f_{ra}}) \times (\bar{g_a} - \bar{g_{ra}})|} \tag{16}$$

$$H = 2 \tan^{-1} \dfrac{\overline{E} \cdot (\bar{f_a} \times \bar{f_{ra}})}{\bar{f_a} \cdot \bar{f_{ra}} - 2(\overline{E} \cdot \bar{f_a})^2 + 1} \tag{17}$$

where $\overline{E}$ is a unit vector in an axial direction for rotating the attitude from $(\bar{f_{ra}}, \bar{g_{ra}}, \bar{h_{ra}})$ to $(\bar{f_a}, \bar{g_a}, \bar{h_a})$, and $\textcircled{H}$ is a rotation angle around the axis. Based on the calculation results, the B-system position and attitude error $\Delta \bar{x}$ is calculated as follows.

$$\Delta x = \bar{x} - \bar{x_r} = \begin{bmatrix} \Delta \overline{P} \\ \textcircled{H} \overline{E} \end{bmatrix} \tag{18}$$

As seen from the formula (18), the error $\Delta x$ can be changed by changing the parameters $P_{ra}, (\bar{f_{ra}}, \bar{g_{ra}}, \bar{h_{ra}})$. The calculated error $\Delta x$ is transformed by the coordinate transform unit 45 from the B-system to the A-system for the velocity calculation. When the velocity is calculated in the H-system depending on the operation mode of the hand, the error $\Delta x$ is transformed to the H-system. The velocity calculation in the A-system is explained here.

The control main unit 60 comprises an operation condition setting unit 61, a command velocity calculation unit 62 and a coordinate transform unit 63.

The operation condition setting unit 61 calculates an external force $\overline{F}*$ applied to the hand while taking various operation conditions of the hand in the A-system into consideration to allow the hand to carry out a complex motion. Specific examples thereof will be described hereinlater.

The command velocity calculation unit 62 calculates the command velocity $\overline{v}$ of the hand in the A-system based on the force $\overline{F}$ (which is changed to $\overline{F}^*$ by the operation condition setting unit) calculated by the force calculation unit 50 and the position and attitude error $\Delta \overline{x}$ calculated by the position and attitude calculation unit 40, by using the force reference $\overline{F_c}$, the mass matrix [M], the viscosity coefficient matrix [C] and the spring constant matrix [K] as parameters.

$$\overline{v} = [M]^{-1} \int (\overline{F} - \overline{F_c} - [K]\Delta \overline{x} - [C]v)dt \qquad (19)$$

As explained in the description of the principle, since the behavior of the hand is defined by [M], [K] and [C], the operational characteristic of the hand can be set by appropriately selecting the parameters [M], [K] and [C]. Further, by properly selecting the force reference $\overline{F_c}$, the pressing force can be maintained constant or changed so that various operational characteristics of the hand are attained.

The calculated command velocity $\overline{v}$ is represented in the A-system and it is transformed into the B-system by the coordinate transform unit 63 by using the parameters $\overline{P_a{}^h}$, $(\overline{f_a{}^h}, \overline{g_a{}^h}, \overline{h_a{}^h})$, and the transformed velocity is supplied to the angular velocity calculation unit 70.

Since the robot is actually driven and controlled by the angular velocity of the articulation, the command velocity $\overline{v}$ is converted to an articulation angular velocity $\dot{\theta}$ by the angular velocity calculation unit 70 by using the position signal $\theta$ indicating the rotation angle of the robot articulation, the robot arm length $\overline{l}$ and the transform matrix $[A_{1h}]$ as parameters. The angular velocity $\dot{\theta}$ is supplied to the arm drive motor M through the D/A converter 27 and the servo amplifier 18 so that the robot hand is moved at the predetermined velocity.

Figure 12A:
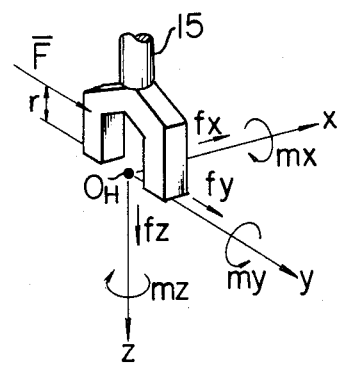
FIGS. 12a and 12b show a first specific application of the present control method.

Specific examples of the control method of the present invention are now explained. In a first example, the RA-system is not movable but fixed to the B-system, the A-system is matched to the H-system, the RA-system is matched to the RH-system, and the initial position and attitude in the A-system match to those in the RA-system. The operation of the hand is explained with reference to FIG. 12. As shown in FIG. 12a, when a force $\overline{F}$ is applied to the hand 15 in the H-system in the y-direction, an external force $\overline{f}$ in the H-system is represented by $$\overline{f}^T = \underbrace{(0 \quad f_y \quad 0}_{\text{translational force}} \quad \underbrace{m_x \quad 0 \quad 0)}_{\text{rotational force}} \qquad (20)$$

where $m_x = f_y xr$

Figure 12B:
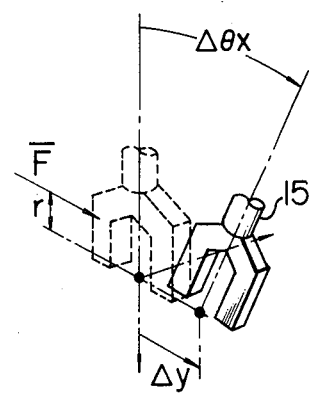

In the formula (19), when $\overline{F_c} = 0$ and $$[M] = \begin{pmatrix} m_{11} & & & 0 \\ & m_{22} & & \\ & & \ddots & \\ 0 & & & m_{66} \end{pmatrix} \qquad (21)$$

$$[C] = \begin{pmatrix} c_{11} & & & 0 \\ & c_{22} & & \\ & & \ddots & \\ 0 & & & c_{66} \end{pmatrix} \qquad (22)$$

$$[K] = \begin{pmatrix} k_{11} & & & 0 \\ & k_{22} & & \\ & & \ddots & \\ 0 & & & k_{66} \end{pmatrix} \qquad (23)$$

then the hand 15 to which the external force $\overline{f}$ is applied stops at the position and the attitude show in FIG. 12(b). In this case, $$\Delta y = f_y / k_{22} \qquad (24)$$

$$\Delta \theta_x = m_x / k_{44} \qquad (25)$$

It means that the control method of the present invention can attain the operation similar to that attainable when a spring is attached to a wrist of the robot, by appropriately setting the parameter [K]. If the force $\overline{F}$ is instantly removed, the origin $O_H$ of the hand monotonically oscillates around an origin of the position reference $\overline{x_r}$, that is, an initial position of the origin $O_H$ of the hand, with an amplitude $\Delta y$, and the attitude of the hand 15 monotonously oscillates around an initial attitude with an amplitude $\Delta \theta_x$ as shown in FIG. 12b. Thus, the hand 15 makes a combined motion of the oscillation of the origin $O_H$ of the hand and the oscillation of the hand attitude. It attenuates as shown by the formula (6). Thus, the position $\overline{X}$ and the attitude $\overline{\textcircled{H}}$ of the hand 15 are expressed as follows.

$$\overline{X} = \begin{pmatrix} 0 \\ x_y \\ 0 \end{pmatrix} \qquad (26)$$

$$\overline{\textcircled{H}} = \begin{pmatrix} H_x \\ 0 \\ 0 \end{pmatrix} \qquad (27)$$

where $x_y = \Delta y \exp(pt)(\cos qt - (p/q)\sin qt)$ $$p = \frac{-C_{22}}{2m_{22}}$$

$$q = 4m_{22}k_{22} - C_{22}^2$$

$$\textcircled{H}_x = \Delta \theta x \exp(p't)\left(\cos q't - \frac{p'}{q'}\sin q't\right)$$

$$p' = \frac{-C_{44}}{2m_{44}}$$

$$q' = 4m_{44}k_{44} - C_{44}^2$$

When a translational force and a rotational force are applied to the hand 15, a restoring force and an attenuation force act so that the end of the hand tends to return to the initial position and the attitude of the hand 15 tends to return to the initial attitude. Accordingly, in spite of the fact that no spring is used, the hand 15 moves as if it were suspended by a spring having six degrees of freedom and satisfying the above condition.

When [K]=[0], the hand operates differently.

In this case, since there is no spring force or restoring force, the hand does not tend to return to the original position and attitude but moves in the direction of the translational force applied to the H-system and rotates around a center axis of the rotational force. Thus, it moves in accordance with the directions and the magnitudes of the applied translational force and rotational force, and stops when the forces are removed. For example, when the force $\overline{F}$ as shown in FIG. 12(a) is applied, the velocity $\overline{V}$ is expressed from the formula (8) as follows.

$$\overline{V^T} = (\underbrace{0 \quad V_y \quad 0}_{\text{translational force}} \quad \underbrace{W_x \quad 0 \quad 0}_{\text{rotational force}}) \tag{28}$$

where $$V_y = \frac{f_y}{C_{22}}\left(1 - \exp\left(-\frac{C_{22}}{m_{22}}t\right)\right)$$

$$W_x = \frac{m_x}{C_{44}}\left(1 - \exp\left(-\frac{C_{44}}{m_{44}}t\right)\right)$$

In the above explanation, the six diagonal elements of the spring constant matrix [K] are all "0" or all non-"0". By setting some of the six diagonal elements to "0" and the others to non-"0", the hand operates in different manners than those two operations described above. For example, when the force is applied, the restoring force acts on the band attitude and the hand attitude tends to return to the original attitude but the hand position is moved in accordance with the applied force.

A second example is now explained. In the second example, the RA-system is movable and the A-system is fixedly matched to the H-system. Accordingly, the RA-system matches to the RH-system and the RA-system is moved.

Figure 13:
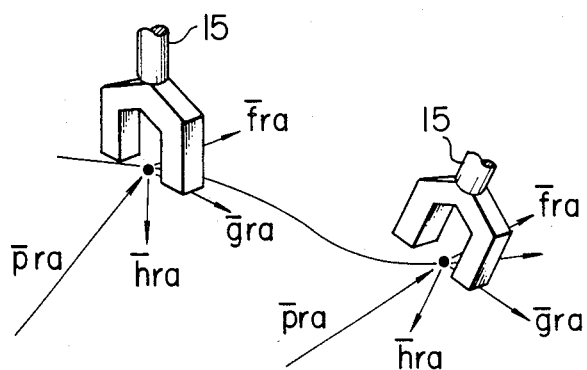
FIG. 13 shows a second specific application of the present control method.

The operation of the hand is explained with reference to FIG. 13. In the first example, the RA-system is fixed to the B-system. As a result, the restoring force to the position and the attitude for the RA-system acts on the hand. Since the restoring force is proportional to the deviation from the RA-system, the hand actually can operate only in the vicinity of the RA-system.

In the present example, the position and the attitude of the RA-system can be moved on the B-system. Since the movement of the RA-system corresponds to the movement of the equilibrium position and attitude of the restoring force, the hand follows the movement. For example, when the position and attitude of the RA-system are moved as shown in FIG. 13, the position and attitude of the hand follow thereto, and the operational characteristic shown in the first example is also attained. Thus, when a force is applied during the movement of the hand, the hand deviates from the movement path of the RA-system by that force but it is returned to the movement path because the restoring force to the RA-system instantly acts. Thus, a motion attainable in a robot having a spring at a wrist can be attained by merely changing the control parameters. The operation therefor is shown by the formula (7). It is basically identical to the formula (6) which shows the operation when the force is applied during the stop of the RA-system. This means that the hand can attain the same operation when the force applied to the robot (when the RA-system is stationary) and the distance of movement of the RA-system are exchanged with each other if they are properly selected.

A third example of the hand operation is explained. First, only the rotating speed is used as the operational condition, the A-system does not match to the H-system, the RA-system does not match to the RH-system and the RA-system is fixed to the B-system and matches to the initial position and attitude of the A-system.

Figure 14:
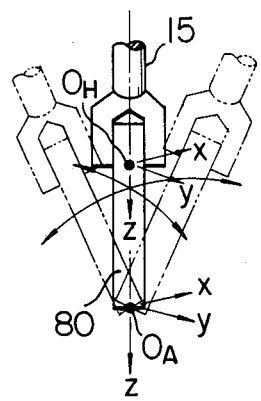
FIGS. 14, 15 and 16 show a third specific application of the present control method.

The operation of the hand is explained with reference to FIG. 14. An end of a shaft 80 gripped by the hand 15 is set as an origin $O_A$ of the A-system. The basic operation is identical to that shown in FIG. 12 except that the A-system is located differently from the H-system. As the operation condition, the translational force and the rotational force around the Z-axis are set to zero.

$$\overline{F^T} = (\underbrace{0 \quad 0 \quad 0}_{\text{translational force}} \quad \underbrace{F_4 \quad F_5 \quad 0}_{\text{rotational force}}) \tag{29}$$

The translational force in the A-system is zero and only the rotational force around the origin $O_A$ of the A-system is permitted. As a result, when the force (whose acting line does not pass the origin) is applied to any point of the hand or the shaft in any direction within the range detectable by the force sensor, the hand and the shaft carry out only the rotational movement which is the combination of the movements around the x-axis and the y-axis. When the force is removed, they return to the original attitude. This operation attains the rotation around the end of the shaft (work), which is a substance of the RCC mechanism described above and useful to an automated assembling work, particularly a precise fitting work.

In another example, only the translational force is used as the hand operation condition, the A-system matches to the H-system, the RA-system matches to the RH-system, and the RA-system is fixed to the B-system and matches to the initial position and attitude of the A-system.

Figure 15:
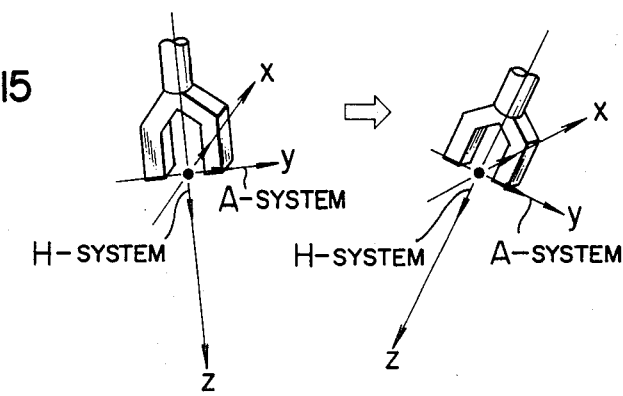

The operation of the hand is explained with reference to FIG. 15. The basic operation is identical to that shown in FIG. 12 except that the rotational force is zero.

$$\overline{F^T} = (\underbrace{F_1 \quad F_2 \quad F_3}_{\text{translational force}} \quad \underbrace{0 \quad 0 \quad 0}_{\text{rotational force}}) \tag{30}$$

The rotational force in the A-system is set to zero. Thus, only the translational force is permitted. Accordingly, whatever force is applied to any point, the hand makes a translational motion with a constant attitude. When the force is removed, the hand returns to the original position. In the formula (23), $k_{11}$ and $k_{12}$ are set to large values and $k_{33}$ is set to a small value. Thus, the hand acts as a soft spring in the directions of the x-axis and the y-axis of the H-system, and acts as a hard spring in the x-axis direction. As a result, when the force is applied as shown in FIG. 15, the hand is swung largely in the z-axis direction and the swings in the x-axis and y-axis directions are small.

Since the A-system is fixed to the H-system, the above feature (large swing in the z-axis direction) is always applicable even if the attitude of the hand changes. Namely, the hand is swung largely in the direction of the center axis of the hand (the z-axis direction of the H-system).

Figure 16:
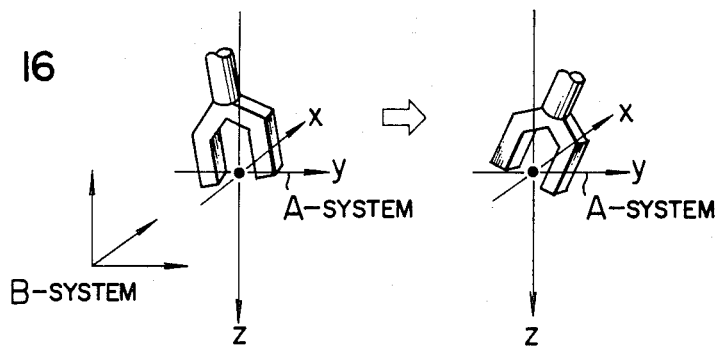

In a further embodiment, only the translational condition is used as the operation condition of the hand, the origin of the A-system is matched to the H-system and the axial direction thereof is matched to the B-system. The operation of the hand is explained with reference to FIG. 16.

In this example, since the direction of the A-system is different from that of the H-system, the direction of the large swing as viewed from the hand changes as the attitude of the hand changes, although it does not change as viewed from the B-system. The direction of the large swing is always in the x-axis direction of the B-system.

It is seen in the above two examples that the hand operation condition can be changed in the H-system and the B-system by the definition of the A-system.

An application in which information from a non-contact sensor is used in the control method of the present invention is explained below.

Figure 17:
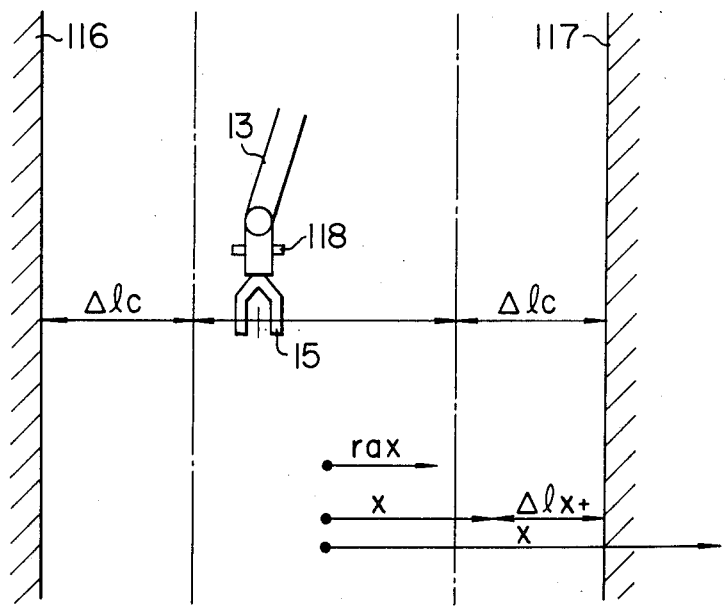
FIGS. 17, 18, 19a, 19b and 20 show an embodiment which is a combination of the present control method and a non-contact sensor.
Figure 18:
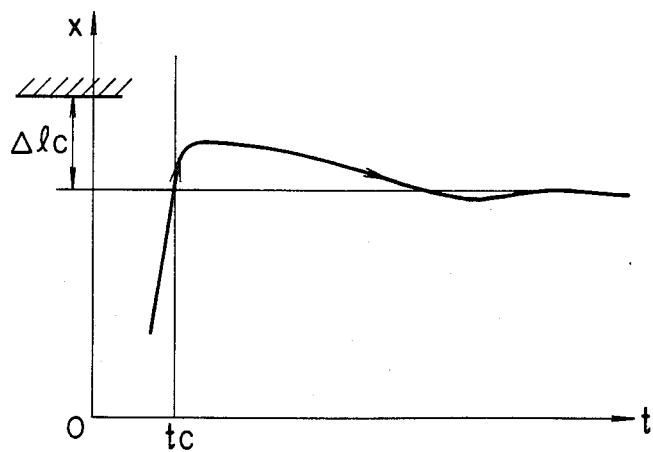

In FIG. 17, if a robot is to enter into a dangerous region while it is position-controlled in a work area space, the entrance into the dangerous region is avoided by the non-contact sensor. As described above, the robot position is controlled by controlling the position reference $\overline{x_{ra}}$. Accordingly, it is expected that the robot remains in the work area space during any operation so long as $\overline{x_{ra}}$ is set in the work area space. However, actually the robot may go beyond the work area, that is, into the dangerous region because of the delays in the parameters [M], [C] and [K] and the robot drive unit, or the malfunction and disturbance. In the example shown in FIG. 17, there are walls 116 and 117 in positive and negative directions along the x-axis and regions within a distance $\Delta lc$ from the walls 116 and 117, respectively, are defined as the dangerous regions. Accordingly, the robot requires at least two non-contact sensors 118 to measure distances to the walls 117 and 116 in the positive and negative directions of the x-axis. The entrance of the robot hand into any of the dangerous regions is detected by the non-contact sensors 118. If the robot hand approaches the wall 117, the entrance into the dangerous region is detected when the distance $\Delta lx+$ to the wall 117 becomes smaller than $\Delta lc$. If the robot hand 15 enters into the dangerous region, it is necessary to push back the robot hand 15 so that $\Delta lx+$ becomes equal to $\Delta lc$. As shown in FIG. 18, if the entrance into the dangerous region is detected at a time tc, the behavior shown in FIG. 5 is immediately taken by the hand so that it can smoothly go out of the dangerous region. It is also possible to emergency-stop the hand at the time tc or move the hand out of the dangerous region not smoothly but with a large acceleration.

The above control by the non-contact sensor can be readily attained by adding the feedback signal from the non-contact sensor to the control method of the present invention described above.

Figure 19A:
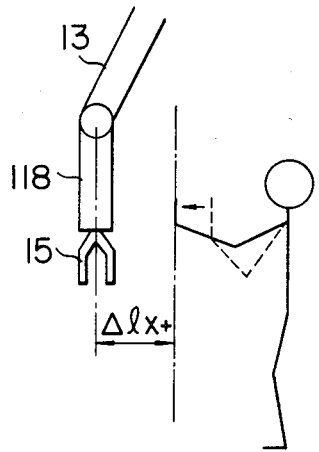
Figure 19B:
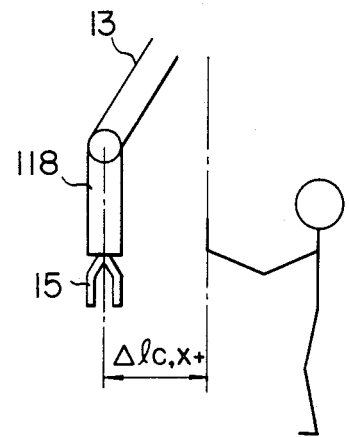

In addition to the above control method, a control shown in FIG. 19 may be used. In FIG. 19, when the robot approaches a human body and a distance therebetween becomes smaller than $\Delta lc$, $x+$, the robot is moved off the human body to the position of $\Delta lc$, $x+$, and when the human body approaches the robot, the robot is controlled in a similar manner. The control shown in FIG. 19 corresponds to the control to a movable wall. This control allows a non-contact direct instruction.

Figure 20:
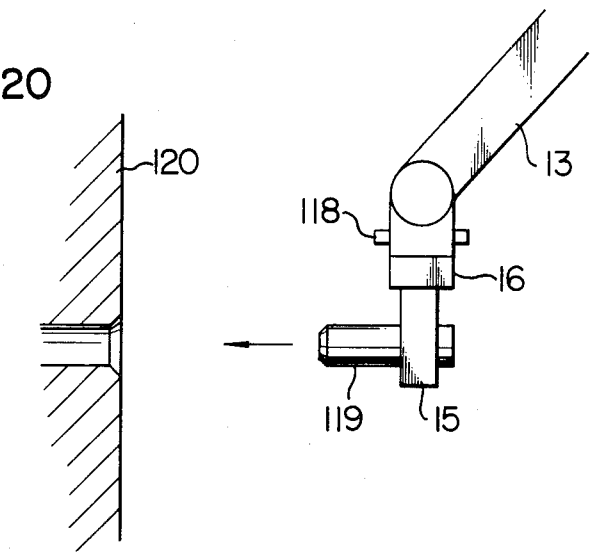

In the above two examples, the distance between the robot and the object is detected and the robot is controlled in accordance with the predetermined reference. FIG. 20 shows an expansion of the above control. In FIG. 20, in addition to a non-contact sensor 118, a force sensor 16 as a contact sensor is mounted on the robot to attain a hybrid control.

Assuming that a shaft-like work 119 is to be fitted to a work 120 having a hole formed therein, it is necessary for the robot to carry the work 119 into the vicinity of the work 120 after the robot has gripped the work 119. It is desirable to carry the work 119 to the work 120 at a high speed, but it is necessary to reduce the carrying speed before the contact because the workpieces are subjected to large impact force if the work 119 contacts to the work 120 at the high speed. If only the contact sensor is mounted, the contact is detected by a large impact or the work is carried at a low speed to avoid the large impact. In any case, the large impact or the low speed is undesirable. However, when the non-contact sensor is used, the large impact can be avoided and the work can be carried at a high speed.

Specifically, a time immediately before work 119 contacts the work 120 is detected by the non-contact sensor 118 and the carrying speed is reduced thereafter, and after work 119 has contacted work 120 at the low speed, the work 119 is fitted to the work 120 by the contact sensor 118.

In the above example, when the distance between the robot hand and the object such as an obstacle is detected by the non-contact sensor to be within the predetermined distance, the control mode to the robot is changed. Accordingly, the robot is properly controlled to the object. When the contact sensor is used in combination with the non-contact sensor, the cooperative control is attained, accordingly, variety of controls can be readily attained by merely changing the control parameters.

As described hereinabove, according to the present invention, the flexibility is imparted to the control of the robot and the following advantages are offered.

A tool having a desired performance may be assumed and the equivalent performance to that of the tool can be attained by the robot. The tool to be assumed is exchangeable.

In the past, the tools were exchanged sequentially. In the present invention, the exchange can be attained by simply changing the control parameters.

When it is desired to operate the robot in a slightly different operation mode with the same tool, it was necessary in the prior art method to sequentially adjust a portion of the tool. In the present invention, the characteristic of the tool can be changed in on-line by changing the control parameters.

While the present invention has been described from the aspect of the tool substitution function, the present invention also provides a simulation function.

For example, when a wrist mechanism to be attached to the robot is to be designed and it is desired to know the behavior of the mechanism prior to the fabrication, the present method is used to cause the robot to simulate the operation.

The higher the precision of the robot is, the higher is the advantages by the tool substitution function and the simulation function. However, undesired oscillation or delay may exist in the robot because of the oscillation due to the resiliency of the arm and the lack of rigidity of the reduction gear, other mechanical factors or electrical factors.

If such oscillation or delay of the robot is analyzed and predicted, the compensation therefor can be imparted by the present invention.

As described hereinabove, the present invention offers various useful advantages.

We claim:

1. A method for controlling a robot comprising the steps of:
   detecting a force applied to a hand of the robot to produce a force signal;
   calculating a first value representing a difference between said force signal and a force reference;
   calculating a second value representing a product of a difference between a position signal representing-current position and attitude of said hand and a position reference multiplied by a spring constant;
   calculating a third value representing a product of a velocity signal representing a current velocity of said hand multiplied by a viscosity coefficient; and
   controlling the hand of the robot by generating a command velocity, with the value of said command velocity being based on said first, second and third values and a coefficient to mass.

2. A method for controlling a robot according to claim 1 wherein said command velocity is used as said velocity signal.

3. A method for controlling a robot according to claim 2 wherein a position signal produced by a position sensor mounted on said robot is used as said position signal.

4. A method for controlling a robot according to claim 1 wherein a velocity signal produced by a velocity detector mounted on said robot is used as said velocity signal.

5. A method for controlling a robot according to claim 1 wherein a differentiation of a position signal produced by a position detector mounted on said robot is used as said velocity signal.

6. A method for controlling a robot according to claim 1 wherein a position signal produced by a position detector mounted on said robot is used as said position signal.

7. A method for controlling a robot according to claim 1 wherein an integration of a velocity signal produced by a velocity detector mounted on said robot is used as said position signal.

8. A method for controlling a robot according to claim 1 wherein said position reference is controlled based on position information from a non-contact sensor mounted on said robot.

9. A method for controlling a robot according to claim 1,
   further comprising the step of determining the values of the spring constant, the viscosity coefficient, and the mass coefficient experimentally before detecting the force applied.

10. A robot control apparatus comprising:
    first means for providing a force signal based on a force applied to a hand of a robot;
    second calculation means for calculating a position signal representing a position and an attitude of said hand based on information about the position of the hand;
    third calculation means for calculating a command velocity of said hand based on said force signal and said position signal; and
    fourth means for generating an articulation angular velocity signal for controlling said robot, the value of said articulation angular velocity being based on said command velocity.

11. The control apparatus of claim 10, further comprising fifth means coupled to said third means, for generating a velocity signal representing a current velocity of the hand modified by a viscosity coefficient, whereby said third means calculates said command velocity based on said force signal, position signal, and velocity signal.

12. The control apparatus of claim 11, further comprising:
    memory means coupled to said second means, third means, and fifth means, for storing values of a spring constant, a mass coefficient and said viscosity coefficient.

13. The control apparatus of claim 11, wherein said fifth means includes means coupled to said third calculation means for receiving said command velocity, whereby said fifth means generates said velocity signal on the basis of the value of said command velocity.

14. The control apparatus of claim 11, wherein said fifth means includes means for receiving a sensed signal having a value proportional to said current velocity of the hand, whereby said fifth means generates said velocity signal on the basis of the value of said command velocity.

15. The control apparatus of claim 11, wherein said second calculation means includes means coupled to said third calculation means for receiving said command velocity as said information about the position of the hand.

16. The control apparatus of claim 11, wherein:
    said second calculation means includes means coupled to said third calculation means for receiving said command velocity as said information about the position of the hand; and
    said fifth means includes means coupled to said third calculation means for receiving said command velocity, whereby said fifth means generates said velocity signal on the basis of the value of said command velocity.

17. The control apparatus of claim 11, furher comprising:
    memory means coupled to said second calculation means, third calculation means and fifth means for storing values of a spring constant, said viscosity coefficient, and a mass coefficient, whereby said second calculation means uses said spring constant to calculate said position signal, said third calculation means uses said mass coefficient to calculate said command velocity, and said fifth means uses said viscosity coefficient to generate said velocity signal.

18. The control apparatus of claim 10, wherein said first means comprises:
first transform means for transforming a first sensed signal proportional in value to the magnitude of said applied force into a first intermediate signal representative of the magnitude of said applied force at a point defined in a first coordinate system;
second transform means for transforming said first intermediate signal into a second intermediate signal representative of the magnitude of the applied force in a second coordinate system defined by the hand of the robot;
compensation means for providing a compensation component on the basis of said position signal, and the masses and centers of gravity of the hand and any object supported by said hand;
correction means for modifying said second intermediate signal on the basis of said compensation component to provide a third intermediate signal; and
third transform means for transforming said third intermediate signal into said force signal representative of the magnitude of the applied force in a third coordinate system having an origin at a point of rotational moment due to movement of the hand.

19. A robot control apparatus comprising:
first means for providing a force signal based on a force applied to a hand of a robot, and for providing a first value representing a difference between the force signal and a force reference;
second means for calculating a position signal representing a position and an attitude of said hand based on information about the position of the hand, and for providing a second value representing a product of a difference between the position signal and a position reference multiplied by a spring constant;
third means for calculating a command velocity of said hand based on said first value, said second value, and a mass coefficient; and
fourth means for generating an articulation angular velocity signal for controlling the robot, the value of said articulation angular velocity being based on said command velocity.

20. The control apparatus of claim 19, further comprising fifth means coupled to said third means, for generating a velocity signal representing a current velocity of the hand modified by a viscosity coefficient, whereby said third means calculates said command velocity based on said first value, second value, velocity signal, and mass coefficient.

21. The control apparatus of claim 20, further comprising:
memory means coupled to said second means, third means, and fifth means, for storing values of said spring constant, mass coefficient and viscosity coefficient.

22. The control apparatus of claim 20, wherein said fifth means includes means coupled to said third means for receiving said command velocity, whereby said fifth means generates said velocity signal on the basis of the value of said command velocity.

23. The control apparatus of claim 20, wherein said fifth means includes means for receiving a sensed signal having a value proportional to said current velocity of the hand, whereby said fifth means generates said velocity signal on the basis of the value of said command velocity.

24. The control apparatus of claim 20, wherein said second means includes means coupled to said third means for receiving said command velocity as said information about the position of the hand.

25. The control apparatus of claim 20, wherein:
said second means includes means coupled to said third means for receiving said command velocity as said information about the position of the hand; and
said fifth means includes means coupled to said third means for receiving said command velocity, whereby said fifth means generates said velocity signal on the basis of the value of said command velocity.

26. A robot control apparatus comprising:
first means for providing a force signal based on a force applied to a hand of a robot;
second means for calculating a position signal representing a position and an attitude of said hand based on information about the position of the hand;
third means for generating a velocity signal representing a current velocity of the hand modified by a viscosity coefficient; and
fourth means for generating a command velocity for the hand on the basis of said force signal, position signal, velocity signal and a mass coefficient.

27. The control apparatus of claim 26, wherein said third means includes means coupled to said fourth means for receiving said command velocity, whereby said third means generates said velocity signal on the basis of the value of said command velocity.

28. The control apparatus of claim 26, wherein said third means includes means for receiving a sensed signal having a value proportional to said current velocity of the hand, whereby said third means generates said velocity signal on the basis of the value of said command velocity.

29. The control apparatus of claim 26, wherein said second means includes means coupled to said fourth means for receiving said command velocity as said information about the position of the hand.

30. The control apparatus of claim 26, wherein:
said second means includes means coupled to said fourth means for receiving said command velocity as said information about the position of the hand; and
said third means includes means coupled to said fourth means for receiving said command velocity, whereby said third means generates said velocity signal on the basis of the value of said command velocity.

31. The control apparatus of claim 26, further comprising:
memory means coupled to said second means; third means and fourth means for storing values of a spring constant, said viscosity coefficient, and said mass coefficient, whereby said second means uses said spring constant to calculate said position signal and said third means uses said viscosity coefficient to generate said velocity signal.

* * * * *